United States Patent [19]

Eichinger

[11] 4,118,996
[45] Oct. 10, 1978

[54] REVERSING GEAR IN PARTICULAR FOR A Z-DRIVE FOR WATERCRAFTS

[75] Inventor: Johann Eichinger, Putzbrunn, Germany

[73] Assignee: Carl Hurth Maschinen- und Zahnradfabrik, Munich, Germany

[21] Appl. No.: 778,152

[22] Filed: Mar. 16, 1977

[30] Foreign Application Priority Data

Apr. 6, 1976 [DE] Fed. Rep. of Germany ....... 2614845

[51] Int. Cl.$^2$ ...................... F16H 57/00; B63B 35/30; F16D 11/06; F16D 21/02
[52] U.S. Cl. ...................................... 74/404; 115/35; 192/21; 192/48.91; 192/54
[58] Field of Search .................. 74/404, 417, 423; 192/54, 21, 48.91; 115/35

[56] References Cited

U.S. PATENT DOCUMENTS

| | | | |
|---|---|---|---|
| 2,093,357 | 9/1937 | Harper | 192/21 X |
| 3,176,811 | 4/1965 | Smith | 192/48.91 X |
| 3,238,818 | 3/1966 | Heintz | 192/54 X |
| 3,251,441 | 5/1966 | Winter | 192/54 X |
| 3,703,226 | 11/1972 | Strehler et al. | 192/54 X |
| 3,931,874 | 1/1976 | Braun et al. | 192/54 |
| 3,946,698 | 3/1976 | LaFollette et al. | 115/35 |

Primary Examiner—Leonard H. Gerin
Attorney, Agent, or Firm—Blanchard, Flynn, Thiel, Boutell & Tanis

[57] ABSTRACT

An improvement in a clutch control of a reversing gear arrangement for a Z-drive for watercrafts. The reversing clutch coupling includes two beveled pinion gears which act onto a common driven bevel gear. The reversing coupling consists of two alternately engageable friction couplings, the friction members of which are compressed onto one another by rolling elements to reinforce the engagement force. The friction members are movable against a resilient force provided by flexible elements, such as cup springs which engage the opposite side of the clutch pack from the friction members.

2 Claims, 5 Drawing Figures

REVERSING GEAR IN PARTICULAR FOR A Z-DRIVE FOR WATERCRAFTS

FIELD OF THE INVENTION

The invention relates to a reversing gear and, more particularly, to a reversing clutch coupling having two beveled pinion gears which act onto a common driven bevel gear, in particular for a Z-drive for watercrafts.

BACKGROUND OF THE INVENTION

Reversing gears are already known for such purposes, in which the bevel pinion gears are coupled alternately by means of a coupling box which has jaws or the like with the drive shaft. Said reversing gears can be shifted only during standstill or they cause impulses, if they are shifted during running transmission.

The basic purpose of the invention is to provide a reversing gear which operates during a running transmission smoothly and without noticeable impulses. If such a transmission is used in a watercraft, then same is supposed to be able to be reversed quickly and reliably.

Further advantages and characteristics of the invention can be taken from the following description.

BRIEF DESCRIPTION OF THE DRAWINGS

The invention is discussed in connection with one exemplary embodiment which is illustrated in connection with FIGS. 1 to 5.

In the drawings.

DETAILED DESCRIPTION

Figure 1:
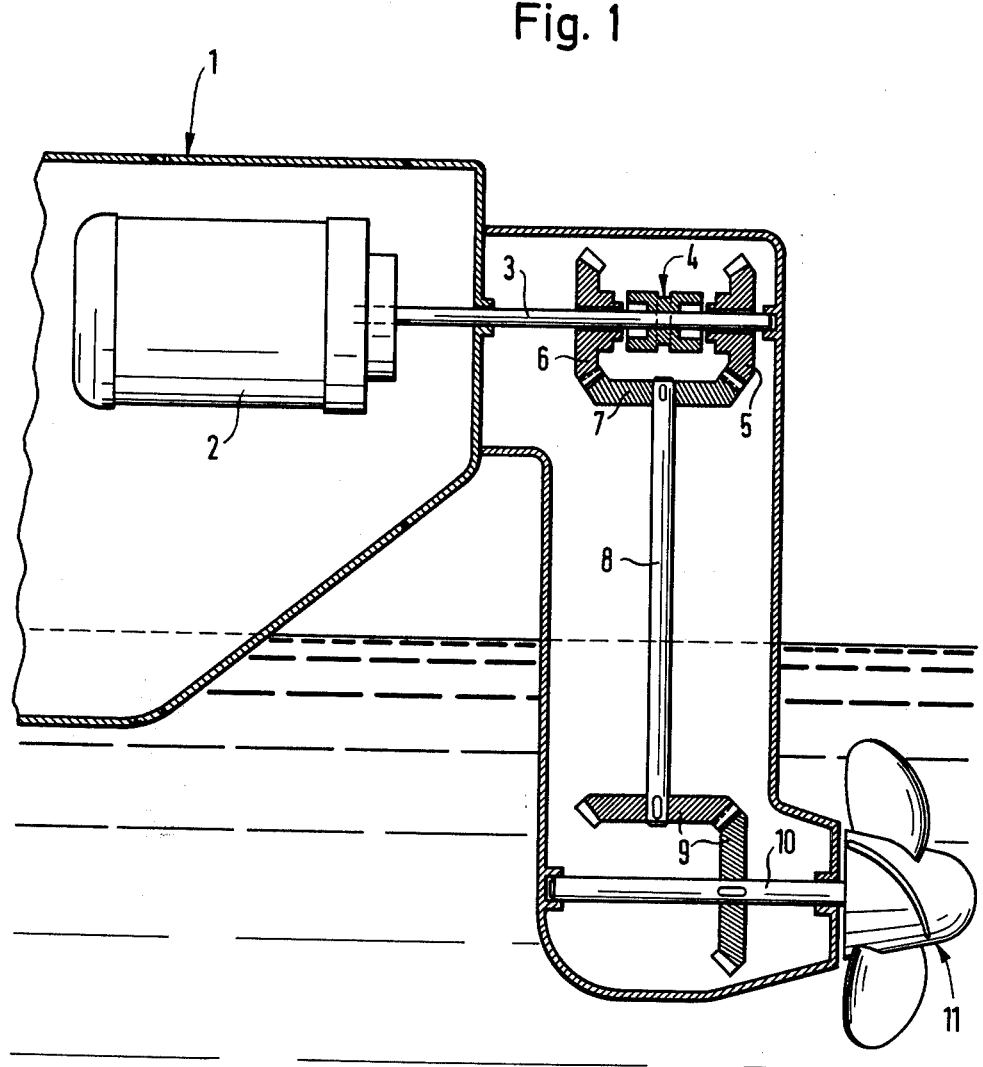
FIG. 1 schematically illustrates the entire structure of a Z-drive for watercrafts.
Figure 2:
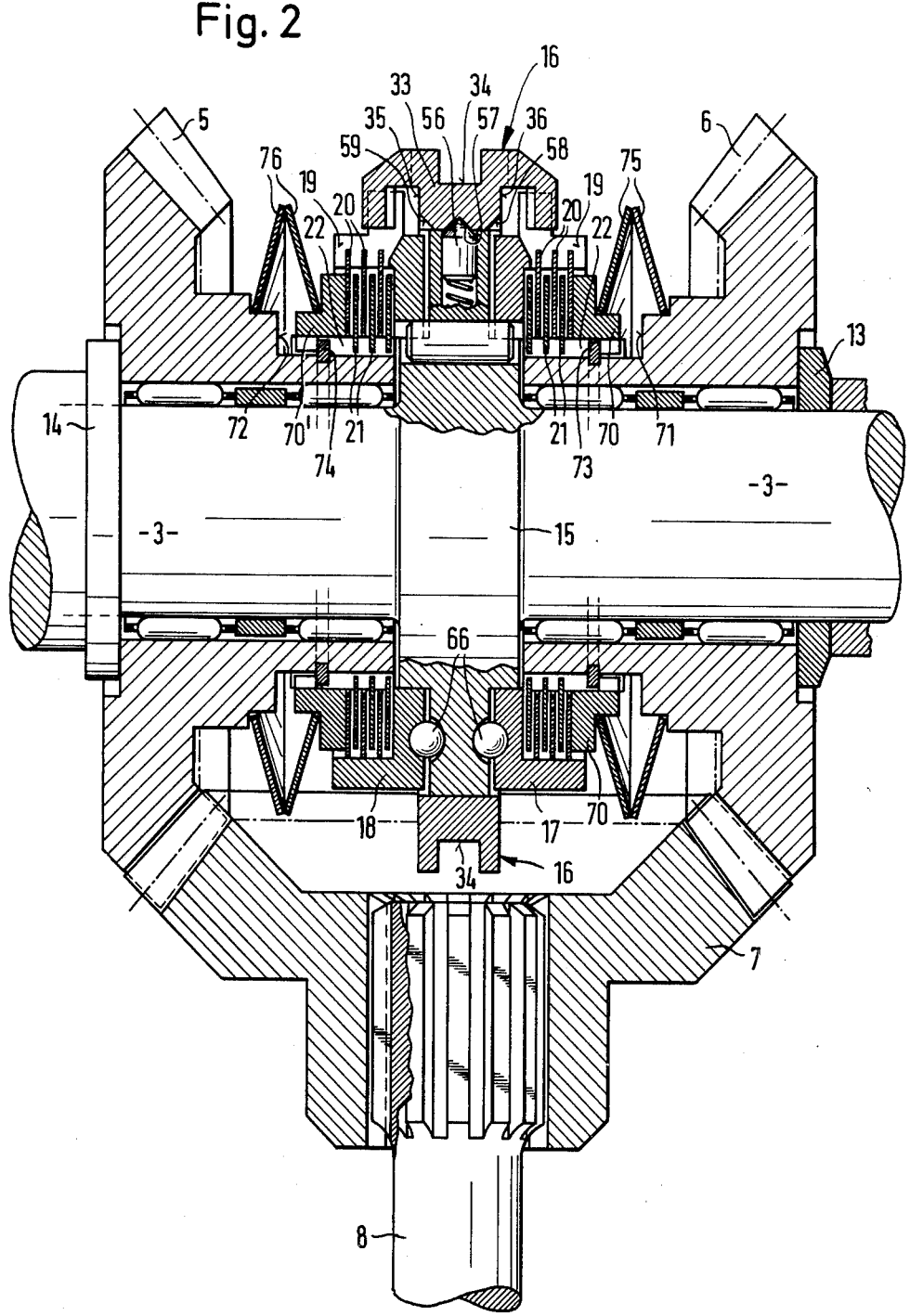
FIG. 2 illustrates in cross section a view of a reversing gear embodying the invention.
Figure 4:
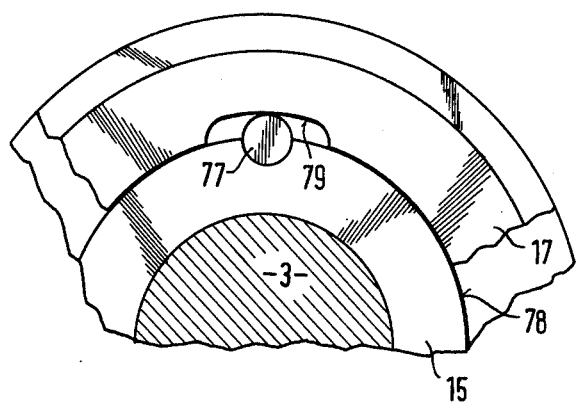
FIG. 4 illustrates a stop mechanism in the coupling according to the invention.

From a motor 2 which is supported in a watercraft 1 through a substantially horizontal drive shaft 3, a reversing clutch 4 is selectively driven through two bevel pinion gears 5, 6 which mate with a common driven bevel gear 7 mounted on the upper end of a vertically aligned drive shaft 8 which extends below the water surface. The cone formed by the top lands is commonly known as a face cone. The apexes of the face cones are commonly known as cone centers. The cone centers for each of the bevel gears are coincident with the axis of rotation of the drive shaft 3 and with each other. The reversing clutch 4 and the said bevel gears form a reversing gear arrangement. From the driven shaft 8, the torque is transmitted through a bevel-gear pair 9 onto a substantially horizontally extending propeller shaft 10 on which the propeller 11 is mounted. This Z-drive can be constructed as a so-called steerable propeller in which the propeller can be pivoted, for the purpose of controlling the watercraft, about a substantially vertical axis for example the axis of the driven shaft 8. This pivotability is not a condition for the invention, however.

Figure 3:
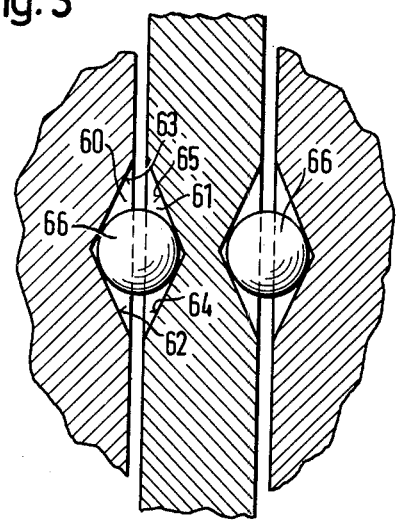
FIG. 3 illustrates rolling elements which reinforce the engagement force and which run up onto ramps.

The bevel pinions 5, 6 are rotatably supported on the drive shaft 3 and are held axially for example with plates 13 or a flange 14 on the shaft 3. The drive shaft 3 extends between the two bevel pinion gears 5, 6 and has a flange or the like thereon which serves as a gear-shift-sleeve carrier 15. The gear-shift-sleeve carrier 15 can also be a separate component mounted on the drive shaft and can be secured thereto. A gear-shift sleeve 16 is guided for longitudinal movement on the gear-shift-sleeve carrier 15. The gear-shift sleeve 16 is secured against rotation by not shown but known means on the gear-shift-sleeve carrier 15. A friction ring 17, 18 is provided on both sides of the gear-shift-sleeve carrier 15 and is rotatably centered with respect to the axis of the shaft 3. The outer diameter of the friction rings 17, 18 corresponds to the outer diameter of the gear-shift-sleeve carrier 15. The friction rings 17, 18 have recesses 19 for receiving the external clutch teeth of so-called externally driven disks 20. The externally driven disks cooperate with so-called internally driven disks 21 which engage internal clutch teeth corresponding to the external clutch teeth 22 of the bevel pinion gears 5, 6. The thus formed disk packages are each engaged axially outwardly by one pressure plate 70, 70'. The friction rings, the disk packages and the pressure plates each form a clutch pack. The friction ring or the friction rings 17, 18 and the sleeve carrier 15 have recesses 60, 61 (FIG. 3) therein on the mutually facing sides thereof. The mutually facing recesses each have two flat sloped surfaces 62, 63, 64, 65 therein. Balls are received therebetween and function as rolling elements. When the friction ring and the sleeve carrier are rotated relatively against one another, the balls 66 run up onto the flat sloped surfaces, which thus serve as a ramp, and thereby urge the friction ring or the friction rings away from the sleeve carrier to thereby compress the aforementioned disks 20, 21. The gears 5, 6 thus become coupled to the shaft 3 through the disks, the respective friction ring 17, 18, the respective balls 66 and the sleeve carrier 15. Differing from FIG. 3, the recesses can also be inclined so that the rolling elements 66 can run up on a ramp surface only in one direction of rotation.

Figure 5:
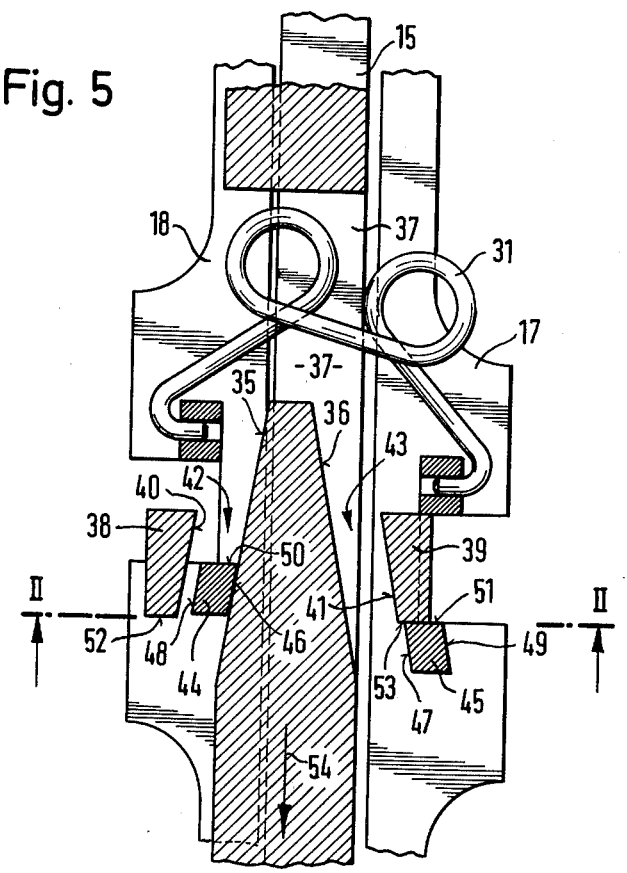
FIG. 5 illustrates an example of the sloped surfaces which start the engagement and disengagement.

The friction rings 17, 18 (FIG. 5) are urged toward the sleeve carrier 15 by one or several hairpinlike bent return springs 31. For reasons of installation, the return springs 31 are arranged on the outside of the friction member or firction members 17, 18. The gear-shift sleeve 16 consists of an annular sleeve member 33 having on the outside periphery thereof an annular groove 34 for receiving a gear-shift fork (not shown) therein. The sleeve member 33 has on the inner surface adjacent the front side two sloped surfaces which converge toward the center and which are called first pressure surfaces 35, 36 (FIG. 5). When the sloped surfaces 62, 63, 64, 65 on the friction members 17, 18 which serve as a ramp for the rolling elements are inclined in a certain peripheral direction, enlarging the recess, then the first pressure surfaces 35, 36 converge in the same direction toward the center plane (plane of rotation) of the sleeve member. Openings or spacings 37 are provided adjacent the part of the sleeve member 33 which forms the first pressure surfaces, which openings receive the return springs 31 therein. Webs 38, 39 are secured to the sleeve member 33 and are axially spaced from the first pressure surfaces 35, 36. Each of the webs has on the side which faces the first pressure surfaces second pressure surface 40, 41 which are parallel with said first pressure surfaces. The spacings between the sleeve member 33 and the webs 38, 39 form inwardly open grooves 42, 43. Teeth 44, 45 are provided on the periphery of the friction members 17, 18 and each tooth has on the side which faces the gear-shift sleeve 16 one so-called counterpressure surface 46, 47, which are parallel with respect to the aforementioned first pressure surfaces on the sleeve member 33. On the other side of each tooth, a countersurface 48, 49 is provided which extends parallel with respect to the respectively facing second pressure surfaces 40, 41 on the web. In axial direction, the grooves 42, 43 are wider than the teeth 44, 45. On the circumferentially facing side of the teeth 44, 45, the teeth have a surface 50, 51, which is directed at least approximately perpendicular with respect to the plane of rotation (direction of rotation). On the circumferentially facing side of the webs 38, 39, the webs 38, 39 have a stop surface 52, 53, which is also directed approximately perpendicular with respect to the plane of rotation. A drop-in or detent pin 56 guided for radial movement in the sleeve carrier 15, which drop-in pin is biassed by a spring.

A locking recess 57 for locking the gear-shift sleeve 16 in the disengaged condition is provided in the center of the sleeve member 33. Two laterally opening locking openings 58,59 are provided on the faces of the gear-shift sleeve 16 for fixing the two engaged conditions. The drop-in pin 56 and the sloped surfaces at the faces of the gear-shift-sleeve member 33 support the clutch engagement operation.

For the description of the operation it is assumed that the drive shaft 3 rotates in the direction of the arrow 54 (FIG. 5). If the reversing coupling is disengaged, then the surfaces 50, 51 of the teeth 44, 45 rest on the stop surfaces 52, 53. The rolling elements 66 lie in the deepest points of the recesses. A relative movement between the gear-shift sleeve and the friction rings is prevented by the surfaces 50, 51 and stop surfaces 52, 53 of the teeth and webs. If the left coupling is to be engaged, then the gear-shift sleeve 16 is moved to the left (FIG. 5). The lock between the web 39 and the tooth 45 on the right side remains thereby in existence, however, the lock on the left side is cancelled. At the same time the first pressure surface 35 contacts the counterpressure surface 46 and slightly moves the friction ring 18 to the left. By this a precoupling is achieved, namely the contacting internal and external disks 20, 21 rotate the friction ring against the direction of the arrow 54 relative to the sleeve member. This causes the balls 66 to run up onto the ramp and to compress the disks and clutch coupling is engaged. Through the inclination of the first pressure surface its friction is reduced, furthermore it supports the relative movement, namely the running of the rolling elements up onto the ramp.

To disengage the coupling, the gear-shift sleeve 16 is moved to the right. The second pressure surface 40 and the countersurface 48 engage one another and the disks become disengaged and the friction ring 18 is taken along by the sleeve carrier 15 through the rolling elements 66 and, supported by the inclination of the second pressure surface and the counter surface and by the springs 31, the rolling elements 66 run off from the ramps and are placed again into the lowermost point of the recesses. The uncoupling operation is ended.

The pressure plates 70, 70' are arranged with axial play axially with respect to the internal and external disks 20, 21. The play is limited on the one side by a shoulder 71, 72 which is formed by the bevel pinion gears 5, 6 and on the other side each by one spring ring 73, 74 or the like. The pressure plates 70, 70' are loaded by cup springs 75, 76 in the sense of coupling. The spring plates 70, 70' are arranged so that the disks are not compressed by the pressure plates when the friction rings 17, 18 are in the centered disengaged condition. One or several pins 77 are provided in the gear-shift-sleeve carrier 15 so that its axis extends parallel with respect to the axis of rotation. Furthermore the pins are arranged so that half of their circumference lies in the sleeve carrier 15 while the other part projects outwardly therefrom. The friction rings have on their periphery which corresponds which the centering surface 78 a recess 79, which surrounds the pin or the pins. The pin or the pins act as a stop for the respective friction ring, which can so rotate only over a limited angle. Since during engagement the rolling elements 66 run up onto the ramps, the friction ring needs for its axial movement a capability of movement in the peripheral direction. Since on the other side the pin functions as a stop to limit this movability, it serves also as stop for the axial movement. During coupling, the friction ring does not compress the disks against a fixed end plate but against the resiliently flexible pressure plate 70 or 70'. The maximum frictional force and thus the maximal transmittable torque depends thus from the tension of the spring 75 or 76.

An exceeding of the predetermined overload moment through impacts, as it otherwise can occur during shifting under high rotational speeds or in boat transmissions for example during ground contact, is not possible in the described coupling. Due to the given arrangement, the spring 75, 76 cannot act onto the disk in uncoupled condition, because a two-sided axial mounting is provided and the spring deflection in direction toward the disks is limited.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A reversing gear arrangement, comprising:
    an input shaft;
    axially spaced first and second bevel gears relatively rotatably mounted on said input shaft and with respect to each other and means for preventing a relative axial movement between said first and second bevel gears, said first and second bevel gears each having a common first cone center coincident with the axis of rotation of said input shaft;
    a third bevel gear drivingly coupled to both of said first and second bevel gears, said third bevel gear having a second cone center coincident with said first cone center so that said first, second and third bevel gears define a U-shaped arrangement;
    double clutch means positioned within said U-shaped arrangement defined by said first, second and third bevel gears for selectively drivingly coupling either one of said first and second bevel gears to said input shaft;
    an output shaft fixedly secured to said third bevel gear; and
    torque limiting means on said double clutch means and positioned within said U-shaped arrangement for limiting the magnitude of torque transmitted between the driven one of said first and second bevel gears and said third bevel gear.

2. The reversing gear arrangement according to claim 1, wherein said double clutch means includes a pair of axially spaced clutch packs each having a pair of relatively axially movable friction members and a plurality of interleaved disks therebetween and a gear-shift sleeve member engageable with one of said friction members to effect a compressing of said plurality of interleaved disks together between said pair of friction members; and wherein said torque limiting means includes for each clutch pack means supporting said one friction member for a limited amount of relative rotation with respect to said input shaft, stop means, resilient means resiliently urging the other of said friction members into engagement with said stop means, and torque responsive means for effecting an urging of said one friction member toward the other of said friction members in relation to the magnitude of relative rotation between said one friction member and said input shaft, said resilient means yielding to a predetermined force applied thereto to effectively limit the magnitude of torque transmitted through said clutch pack to said output shaft.

* * * * *